(12) United States Patent
Beesley et al.

(10) Patent No.: US 10,040,639 B2
(45) Date of Patent: Aug. 7, 2018

(54) APPARATUS FOR BUFFERING THE FLOW OF ARTICLES

(71) Applicant: Illinois Tool Works Inc., Glenview, IL (US)

(72) Inventors: Robert C. Beesley, Greenville, SC (US); Jason Bedenbaugh, Greer, SC (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/595,021

(22) Filed: May 15, 2017

(65) Prior Publication Data

US 2017/0247197 A1  Aug. 31, 2017

Related U.S. Application Data

(63) Continuation of application No. 14/991,113, filed on Jan. 8, 2016, now Pat. No. 9,688,482.

(60) Provisional application No. 62/134,094, filed on Mar. 17, 2015.

(51) Int. Cl.
| | |
|---|---|
| *B65G 47/69* | (2006.01) |
| *B65G 47/51* | (2006.01) |
| *B65G 47/68* | (2006.01) |
| *B65G 47/26* | (2006.01) |
| *B65G 47/22* | (2006.01) |

(52) U.S. Cl.
CPC ............ *B65G 47/268* (2013.01); *B65G 47/22* (2013.01); *B65G 47/26* (2013.01); *B65G 47/261* (2013.01); *B65G 47/684* (2013.01); *B65G 2201/02* (2013.01); *B65G 2203/042* (2013.01)

(58) Field of Classification Search
CPC ...... B65G 10/02; B65G 47/68; B65G 47/684; B65G 47/69; B65G 47/682
USPC .................................... 198/447, 778, 347.4
See application file for complete search history.

(56) References Cited

U.S. PATENT DOCUMENTS

| | | |
|---|---|---|
| 2,932,376 A | 4/1960 | Millington |
| 3,053,378 A | 9/1962 | Longenecker |
| 4,168,776 A | 9/1979 | Hoeboer |
| 4,364,465 A | 12/1982 | Kraft |
| 4,549,647 A | 10/1985 | Cossé |
| 4,635,784 A | 1/1987 | Bourgeois |

(Continued)

FOREIGN PATENT DOCUMENTS

| | | |
|---|---|---|
| CA | 1186654 A | 5/1985 |
| DE | 3221343 | 12/1983 |

(Continued)

OTHER PUBLICATIONS

Search Report for International Application No. PCT/US2016/015551 dated May 9, 2016.

*Primary Examiner* — Mark A Deuble
(74) *Attorney, Agent, or Firm* — JK Intellectual Property Law, PA

(57) ABSTRACT

Devices and methods for buffering articles may include use of an infeed conveyor, an outfeed conveyor, and at least two accumulation conveyors defining a path extending between the infeed conveyor and the outfeed conveyor. Each accumulation conveyor includes an entrance portion adjacent the infeed conveyor for receiving articles from the infeed conveyor and an exit portion adjacent the outfeed conveyor for delivering articles to the outfeed conveyor.

11 Claims, 7 Drawing Sheets

(56) References Cited

U.S. PATENT DOCUMENTS

| | | | |
|---|---|---|---|
| 4,917,228 A * | 4/1990 | Ichihashi | B05B 12/14 104/88.03 |
| 4,944,635 A | 7/1990 | Carlier et al. | |
| 5,308,001 A * | 5/1994 | Grecksch | D01H 9/187 198/347.4 |
| 5,413,213 A | 5/1995 | Golz et al. | |
| 5,490,589 A | 2/1996 | Golz et al. | |
| 5,772,005 A | 6/1998 | Hänsch | |
| 6,026,947 A | 2/2000 | Persson | |
| 6,182,812 B1 | 2/2001 | Hartness, III et al. | |
| 6,260,688 B1 | 7/2001 | Steeber | |
| 6,334,528 B1 | 1/2002 | Bogle | |
| 6,497,321 B2 | 12/2002 | Horton et al. | |
| 6,591,963 B2 | 7/2003 | Wipf | |
| 6,612,420 B1 | 9/2003 | Hartness, III et al. | |
| 7,028,830 B2 | 4/2006 | Beesley et al. | |
| 7,032,742 B2 | 4/2006 | Hartness et al. | |
| 7,165,666 B2 * | 1/2007 | Perini | B65G 47/5181 198/347.4 |
| 7,775,344 B2 | 8/2010 | Balk | |
| 7,810,629 B2 | 10/2010 | Kronseder et al. | |
| 8,042,676 B2 | 10/2011 | Balk | |
| 8,205,737 B2 | 6/2012 | Dirmeier et al. | |
| 8,328,004 B2 | 12/2012 | Balk | |
| 2003/0106772 A1 | 6/2003 | Garvey | |
| 2003/0155212 A1 | 8/2003 | Abert | |
| 2006/0088404 A1 * | 4/2006 | Lafontaine | B65G 1/08 414/791.6 |
| 2010/0140054 A1 | 6/2010 | Broers et al. | |
| 2011/0174596 A1 * | 7/2011 | Johnson | B65G 21/18 198/606 |
| 2011/0259711 A1 | 10/2011 | Wilhelmus et al. | |
| 2014/0138210 A1 | 5/2014 | Buchhauser et al. | |
| 2015/0375941 A1 * | 12/2015 | Balk | B65G 21/14 198/778 |

FOREIGN PATENT DOCUMENTS

| | | |
|---|---|---|
| DE | 19506031 | 7/1996 |
| DE | 19856649 | 6/2000 |
| DE | 10314857 | 10/2004 |
| DE | 10 2004 007 590 | 9/2005 |
| DE | 10312695 | 4/2007 |
| DE | 102006048345 | 4/2008 |
| DE | 102010035472 | 3/2012 |
| GB | 2111010 | 6/1983 |
| WO | WO 99/37564 | 7/1999 |
| WO | WO 2012078661 | 6/2012 |

* cited by examiner

APPARATUS FOR BUFFERING THE FLOW OF ARTICLES

RELATED APPLICATIONS

This application is a continuation of and claims filing benefit of U.S. patent application Ser. No. 14/991,113 filed Jan. 8, 2016, and U.S. Provisional patent application Ser. No. 62/134,094, filed Mar. 17, 2015, both of which are incorporated herein by reference in its entirety.

TECHNICAL FIELD

The present disclosure relates to methods and an apparatus for buffering the flow of articles from an upstream delivery station to a downstream receiving station. More particularly, the disclosure relates to a buffering apparatus having multiple accumulating lanes.

BACKGROUND

Buffers (also at times called accumulators) have been utilized between an upstream delivery station and a downstream receiving station to buffer flows by accumulating articles when the capacity of the downstream receiving station is either shut down or run at a speed wherein it cannot handle the number of articles being fed by the upstream delivery station. Various types of accumulators have been proposed. Some provide first-in, first-out (FIFO) accumulation so that certain articles do not dwell long in the accumulator system.

Some accumulators are horizontal, such as Models 6200 or 7100 DYNAC® sold by Hartness International, Inc. In these accumulators, articles travel from a conveyor stream horizontally and linearly on one belt in a first direction and then reverse direction and flow horizontally and linearly on another belt in an opposite direction to rejoin the conveyor stream. Other accumulators are helical, such as the Models 6400 or 6600 DYNAC® also sold by Hartness International, Inc. In these devices, the first and second conveyors travel parallel curved paths upward and downward. Use of such helical accumulators allows for greater length of conveyor chain for accumulation in a given amount of floor space because some of the accumulation is overlappingly vertical. Accordingly, more articles can be accumulated in a given amount of floor space using a helical accumulator than using a horizontal accumulator with the same width chain.

Other conveyors have been proposed with multiple parallel conveyor lanes used for accumulation. Some of such accumulators use horizontal, linear lanes, such as those disclosed in WO 2012/078661 A1 (Steeber). These devices require a great deal of complexity to drive each lane independently. Backups before and after each lane can happen. Steeber attempts to address these backup issues with extremely complex solutions, including adding additional accumulators directly upstream and downstream of the lanes.

U.S. Pat. No. 7,775,344 B1 (Balk) discloses accumulators with multiple lanes that are arranged in various spiral configurations. The Balk devices would likely also be subject to upstream and downstream backups during operation. Also, some customers do not wish to have accumulation lanes extend vertically as far as these devices do.

Accordingly, further improvements providing reliable and cost effective high-density buffering/accumulation would be welcome, including designs that address one or more of the drawbacks of the above multi-laned devices or designs that provide other benefits.

SUMMARY

According to certain aspects of the disclosure, a device for buffering articles may include, for example, an infeed conveyor, an outfeed conveyor, and at least two accumulation conveyors defining a path extending between the infeed conveyor and the outfeed conveyor. Each accumulation conveyor includes an entrance portion adjacent the infeed conveyor for receiving articles from the infeed conveyor and an exit portion adjacent the outfeed conveyor for delivering articles to the outfeed conveyor. Various options and modifications are possible.

For example, each accumulation conveyor may define a path having at least one curve between the entrance portion and the exit portion.

In other aspects, each accumulation conveyor may have a first lateral side and a second lateral side, the articles being both slid onto and off each accumulation conveyor along one of the first lateral side or the second lateral side. If so, each accumulation conveyor may include a fence on the other of the first lateral side of the second lateral side.

In other aspects, each accumulation conveyor may include an endless loop defining a total length and an active upper surface portion that is at least about 75% of the total length.

In other aspects, each accumulation conveyor may include a diverter adjacent the entrance portion for selectively diverting articles from the infeed conveyor to the accumulation conveyor. If so, each diverter may be movable between a first position permitting articles to move past the diverter on the infeed conveyor and a second position diverting articles from the infeed conveyor onto the accumulation conveyor.

BRIEF DESCRIPTION OF THE DRAWINGS

Further details are set forth in the drawings, in which.

DETAILED DESCRIPTION

Figure 1:
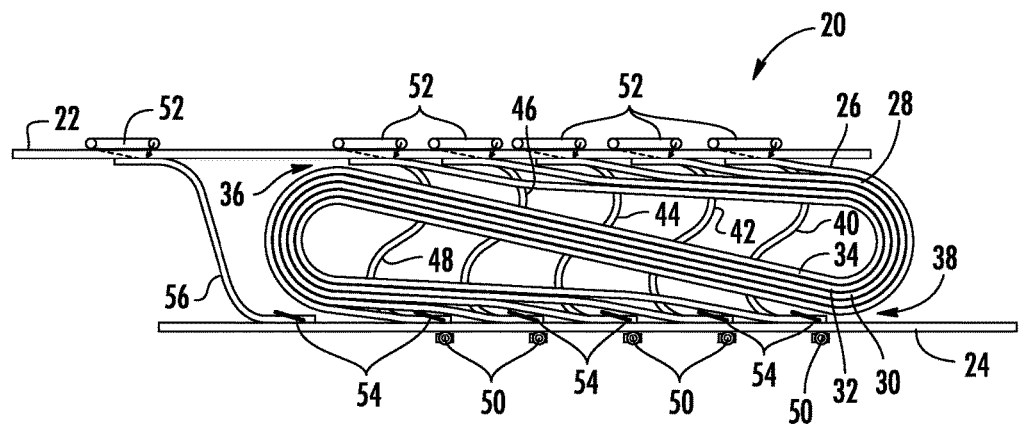
FIG. 1 is a top diagrammatical view of one example of an apparatus for buffering articles according to certain aspects of the invention.

Detailed reference will now be made to the drawings in which examples embodying the present disclosure are shown. The detailed description uses numeral and letter designations to refer to features in the drawings. Like or similar designations in the drawings and description have been used to refer to like or similar parts of the disclosure.

The drawings and detailed description provide a full and enabling description of the disclosure and the manner and process of making and using it. Each embodiment is provided by way of explanation of the subject matter not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

As shown in FIGS. 1-8, a first example of an apparatus 20 is disclosed for buffering a flow of articles within a conveying system. Conveying system may include any type of article handling system, such as a bottling, capping, labeling, packaging, cartoning, shrink or stretch wrapping, palletizing, etc. Apparatus 20 may be used in such system to balance flows where upstream and downstream devices may temporarily operate at different speeds or stop for short periods. Apparatus 20 provides a buffered flow by storing articles when needed due to a downstream disruption and dispensing them when needed due to an upstream disruption.

Apparatus 20 may include an infeed conveyor 22, an outfeed conveyor 24, and at least two accumulation conveyors defining a path extending between the infeed conveyor and the outfeed conveyor. As illustrated, five such accumulation conveyors 26, 28, 30, 32, 34 (also considered lanes 1-5) are depicted. It should be understood that any number greater than two of such accumulation conveyors may be provided, as dictated by the accumulation duration required, size and shape of available floor space and other parameters dictated by the system in which the apparatus is used.

Each accumulation conveyor includes an entrance portion 36 adjacent infeed conveyor 22 for receiving articles from the infeed conveyor and an exit portion 38 adjacent the outfeed conveyor 24 for delivering articles to the outfeed conveyor. Thus articles traveling within the system through apparatus 20 on a respective one of conveyors 26-34 follow a path from the system to infeed conveyor 22, entrance portion 36 to the respective conveyor, along the respective conveyor to its exit portion 38 and then to the outfeed conveyor 24 and back to the system.

Accumulation conveyors 26-34 may comprise conveyor chains or belts of various designs, such as knuckle conveyors with platform tops for carrying articles. The belts are formed as endless loops that follow a return pattern either directly beneath the carrying path or that follow an alternate return path, as desired. As illustrated, conveyors 26-34 have a roughly "S-shaped" conveyance path with shorter, more direct return paths 40-48 beneath the conveyance paths. Motors 50 drive conveyors 26-34, with one motor per conveyor as shown. Motors 50 may be controlled by a conventional programmable logic controller (not illustrated). Conveyors 26-34 and motors 50, controllers, etc., can be similar to those used in Hartness Models 6400 or 6600 DYNAC®, as mentioned above. The conveyors 26-34 can also be independently drivable either with a single motor with chains, gears, axles, clutches, or other mechanical or electro-mechanical systems for selectively engaging and driving one or more of the conveyors at a time.

Such a horizontal, curved multi-lane arrangement with a more direct return path, as opposed to a return path matching the conveyance path, increases the active percentage of the conveyor (the part that can carry articles) from approximately 50% to a higher percentage. For example, an active percentage of a conveyor according to the present disclosure may be over 60%, or even over 75% or 80%. The active percentage may vary depending on the length and arrangement of conveyors 26-34. For example, choosing to include one, two or three or more bends in the conveyor active path may impact the active percentage, as well as whether the entrance portions 36 and exit portions 38 are generally aligned as illustrated, or whether they are spread differently, overlapping, etc. The number and degree of the bends, if present, may also be dictated by the number of lanes of conveyors employed, which all also impact the active conveyor portion efficiency.

Regardless of the particular design ultimately chosen, such a curved path and direct return path reduces the cost of the conveyor component and requires less motor effort to drive it, as compared to a chain with approximately 50% active length and a return path directly below the active path. Accordingly, conveyor and motor costs are reduced, energy use is reduced, and/or replacement parts and maintenance may be less costly with the present designs.

Each of accumulation conveyors 26-34 includes a movable diverter mechanism 52 located along infeed conveyor 22 adjacent the respective entrance portion 36 for selectively diverting articles from the infeed conveyor to the accumulation conveyor. Each diverter 52 is movable between a first position permitting articles to move past the diverter on the infeed conveyor 22 and a second position diverting articles from the infeed conveyor onto the respective accumulation conveyor. Diverters 52 in FIGS. 1-8 are shown only schematically for clarity. The diverters may comprise movable rails, movable driven or idler belts, or other structures. Diverters 54 between exit portions 38 and outfeed conveyor 24 may also be moveable. Alternatively diverters 54 may be fixed, as all articles on a given accumulation conveyor will necessarily move to outfeed conveyor 24 when the accumulation conveyor is driven.

An optional bypass conveyor 56 with its own diverter 52 may be included, defining a path extending between infeed conveyor 22 and outfeed conveyor 24 for transferring articles between the infeed conveyor and the outfeed conveyor. Bypass conveyor 56 may have a path that is substantially shorter than a path defined by each accumulation conveyor 26-34. Bypass conveyor 56 may be (as shown) upstream of the accumulation conveyors 26-34, although the bypass conveyor could be downstream of the accumulations conveyors (to the right of them in FIG. 1).

In operation, if no additional buffering is desired, all flow may go through bypass conveyor 56. It may be desirable to pre-load one or more of conveyors 26-34 and then to use bypass conveyor 56, so if the upstream supply to infeed conveyor 22 slows or stops the bypass conveyor(s) can be used initially to buffer flow to outfeed conveyor 24. However, one of conveyors 26-34 could instead essentially function as the bypass, although the route would be longer than the illustrated bypass conveyor 56.

Figure 2:
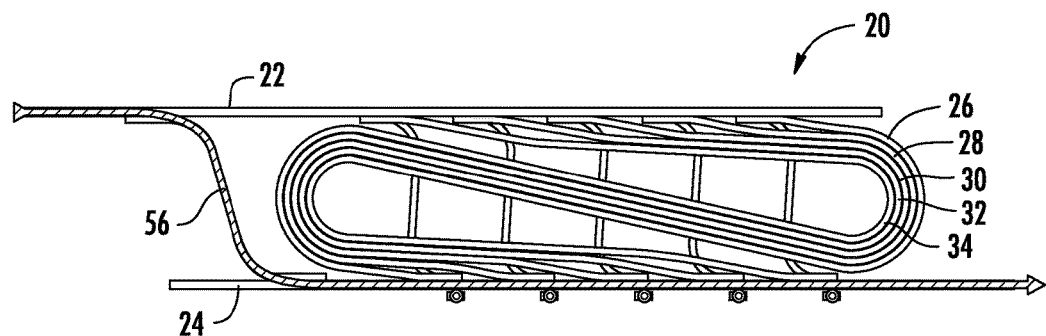
FIGS. 2-8 are top diagrammatical views of the apparatus of FIG. 1 showing a sequence of a buffering operation.

FIGS. 2-8 show one example of operation of apparatus 20 in which cross-hatching on a given conveyor indicates presence of conveyed articles. In FIG. 2, the system is operating in steady state without any preloading of conveyors 26-34. Flow goes from infeed conveyor 22, past diverter 52 and across bypass conveyor 56 and out outfeed conveyor 24.

Figure 3:
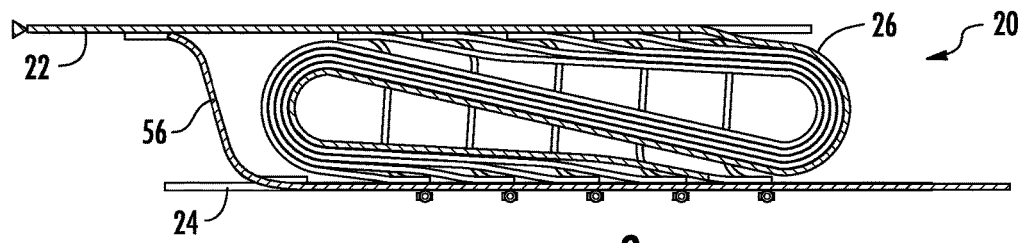

In FIG. 3, the downstream station has stopped or slowed, so bypass 56 and outfeed conveyor 24 also slow or stop. The diverter at bypass conveyor 56 is moved to allow articles to continue along infeed conveyor 22 to lane 1 (conveyor 26) where its diverter directs the flow onto conveyor 26. If the downstream station remains stopped or slowed, additional lanes can be sequentially filled until all such lanes are full at which point the upstream station would have to be stopped.

However, if the downstream station restarts, the apparatus 20 can begin emptying one lane while it fills another.

Figure 4:
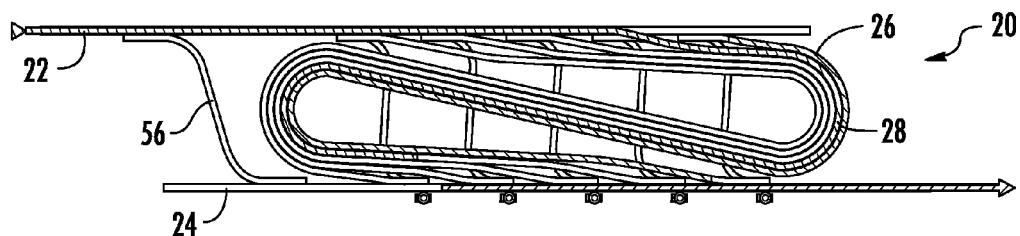

Accordingly, FIG. 4 shows lane 1 full, lane 2 accumulating and almost full, and bypass conveyor 56 and outfeed conveyor 24 in operation.

Figure 5:
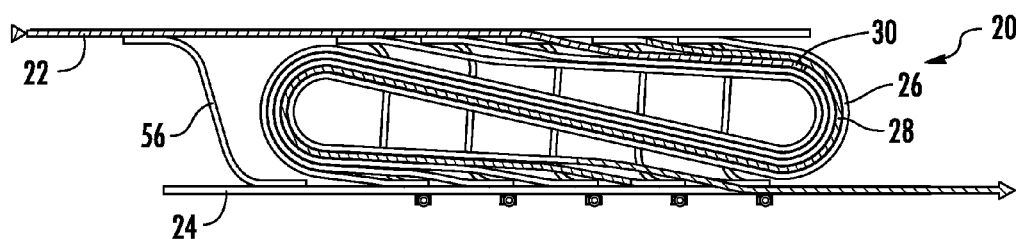

In FIG. 5, all articles from bypass conveyor 56 have passed exit portion 38 of lane 1, and lane 1 has begun emptying, lane 2 has stopped, and lane 3 has begun accumulating.

Figure 6:
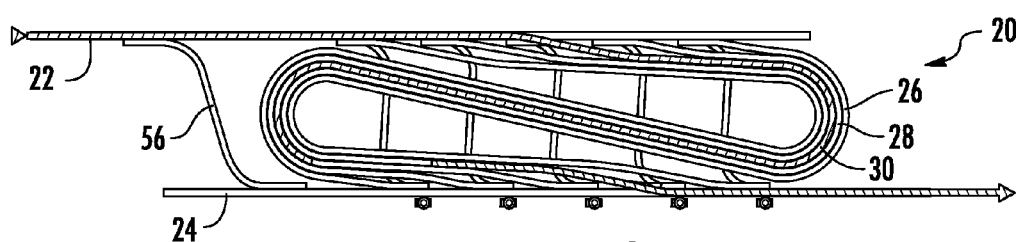

In FIG. 6, the pattern is continued, with lane 2 emptying and lane 3 still accumulating.

Figure 7:
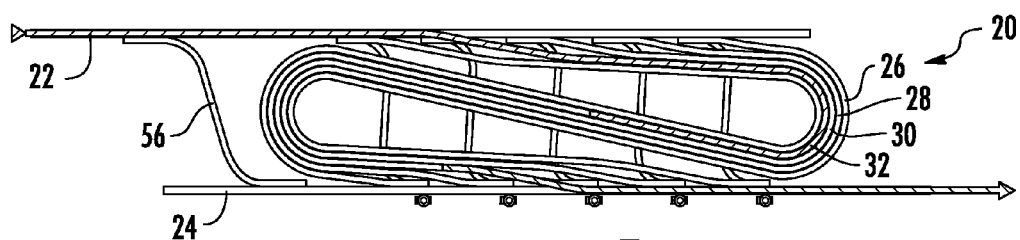

In FIG. 7, lane 3 is emptying and lane 4 is accumulating.

Figure 8:
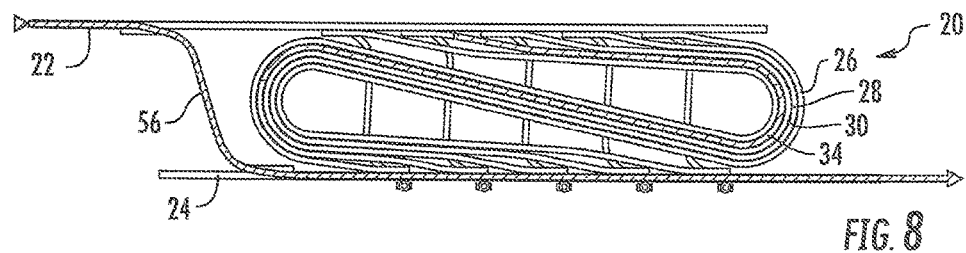
Figure 9:
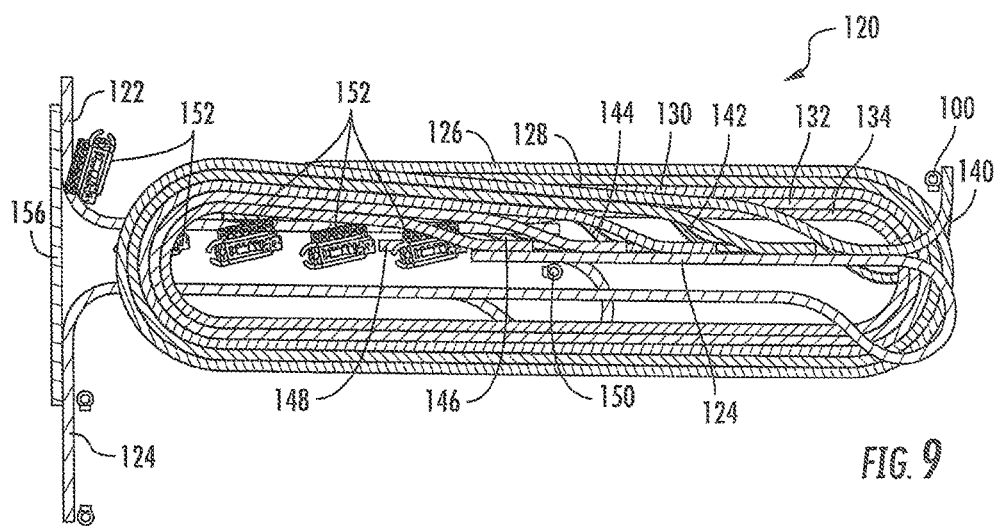
FIG. 9 a top diagrammatical view of another example of an apparatus for buffering articles according to certain aspects of the invention.
Figure 10:
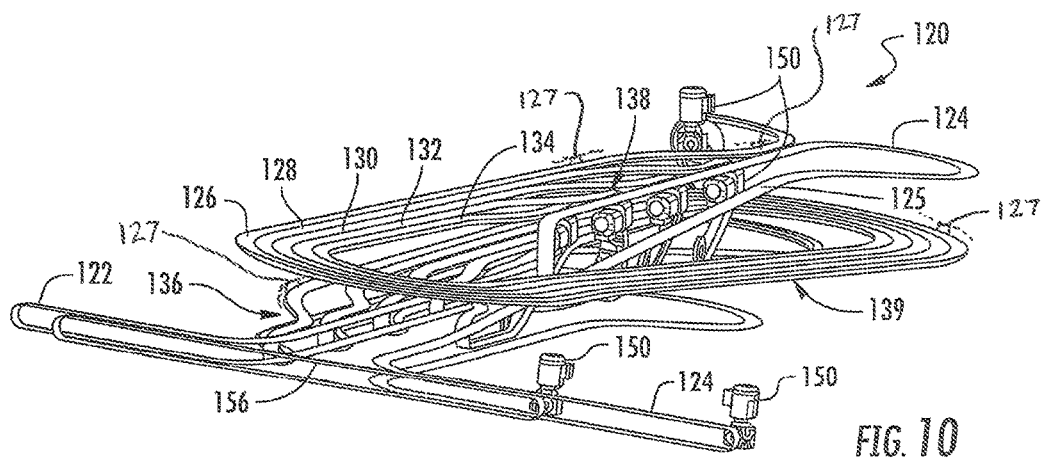
FIG. 10 is an isometric view of the apparatus of FIG. 9.

In FIG. 8, the discharge of apparatus 20 has caught up with the input. Lane 3 has finished its discharge and flow has returned to bypass conveyor 56. Some articles remain in lane 4, preloading apparatus 20 a bit for a future potential stoppage. Upon the next downstream stoppage, lane 4 would be the first to be loaded until full and the cycle would continue.

FIGS. 9-17 show apparatus 120, a modified version of apparatus 20. As shown, apparatus 120 also includes an infeed conveyor 122, and outfeed conveyor 124, five accumulation conveyors 126-134, and a bypass conveyor 156. However, apparatus 120 not only has a curved path for conveyors 126-134, but it also has a vertical rise. The vertical rise is in the form of a spiral. The entrance portions 136 are at a lower elevation, and the exit portions 138 are at a higher elevation, with an upwardly slanted path portion 139 in between. As illustrated, outfeed conveyor 124 receives articles at the higher elevation and takes them on a downward slant 125 back to the same elevation as infeed conveyor 122. However, it should be understood that the outfeed conveyor need not return to the lower elevation if the system is configured accordingly.

The return portions of conveyors 126-134 are again substantially shorter than the active portions, providing the benefits noted above. The spiral configuration of apparatus 120 provides even more accumulation per square foot of floor space due to the vertical overlap and re-use of the same floor space. However, by only having one overlap in the spiral, apparatus 120 still does not introduce the complexity and vertical height of spiral accumulators with multiple turns, which may be desirable in some applications.

Motors 150 are provided to drive the various conveyors, as above. Also, diverters 152 in the form of driven belts that have a pivotable downstream end are provided for selectively directing articles to one conveyor or another where desired, as above.

One benefit of the arrangement of conveyors 126-134 with respect to the infeed and outfeed conveyors 122 and 124 is that conveyors may be formed with upper platforms with one vertical wall, often called a fence 127, along one side. Such a fence 127 helps hold the articles in place on the conveyor. In apparatus 120, articles are slid from infeed conveyor 122 onto one of conveyors 126-134 from a given side (shown best in FIG. 10 as sliding from right to left, toward the fence). The fence 127 (for clarity, shown schematically on conveyor 126 only adjacent infeed conveyor 122 and outfeed conveyor 124, but understood to extend along all of accumulation conveyors 126,128,130,132, 134) would be oriented on the lefthand side of such accumulation conveyors 126-134 when adjacent infeed conveyor 122. When articles are to be slid off conveyors 126-134, they are slid the opposite direction (from left to right, away from the fence) as the fence 127 is again located away from outfeed conveyor 124. Thus, it can be said that each accumulation conveyor 126-134 has a first lateral side and a second lateral side, the articles being both slid onto and off each accumulation conveyor along one of the first lateral side or the second lateral side. This is important where each accumulation conveyor includes a fence 127 on the other of the first lateral side of the second lateral side. To achieve such slide on—slide off functionality with fenced conveyors in apparatus 20, the orientations of one of the entrance portions or the exit portions of conveyors 26-30 would have to be altered. The conveyor paths might therefore change, also requiring change in the return portions as well. It should be understood that the present disclosure is intended to cover such modifications of the two embodiments to "mix and match" respective functions and features.

Figure 11:
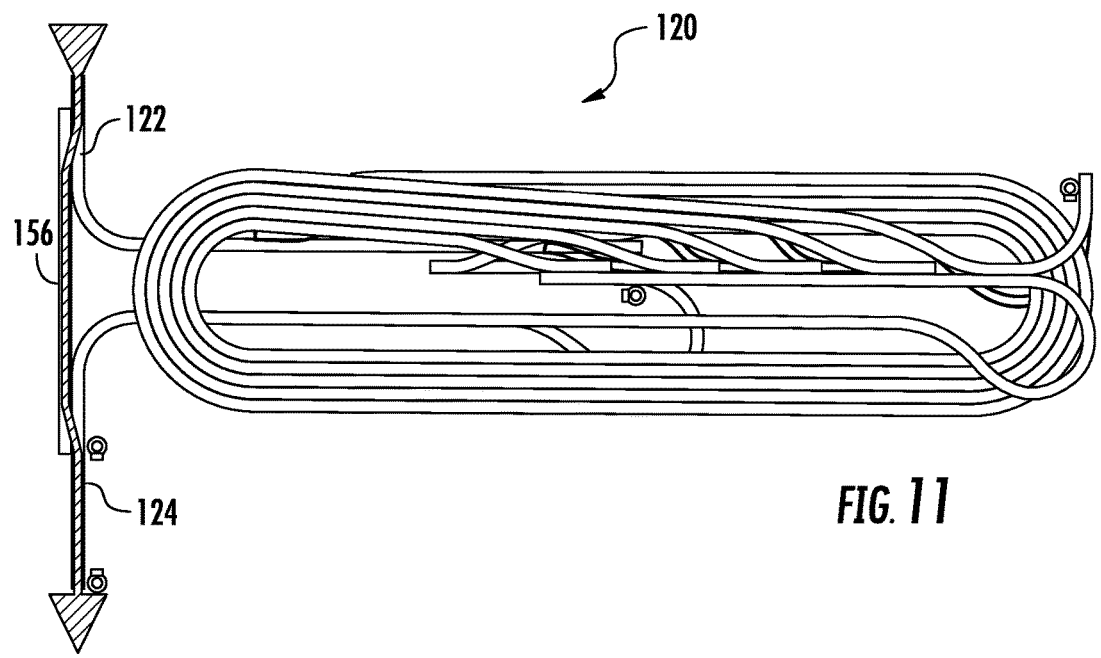
FIGS. 11-17 are top diagrammatical views of the apparatus of FIG. 9 showing a sequence of a buffering operation.

FIGS. 11-17 show a series of conditions of apparatus 120 as buffering of flow occurs. In FIG. 11, steady state flow without accumulation or buffering is occurring, and articles are passing along bypass conveyor 156.

Figure 12:
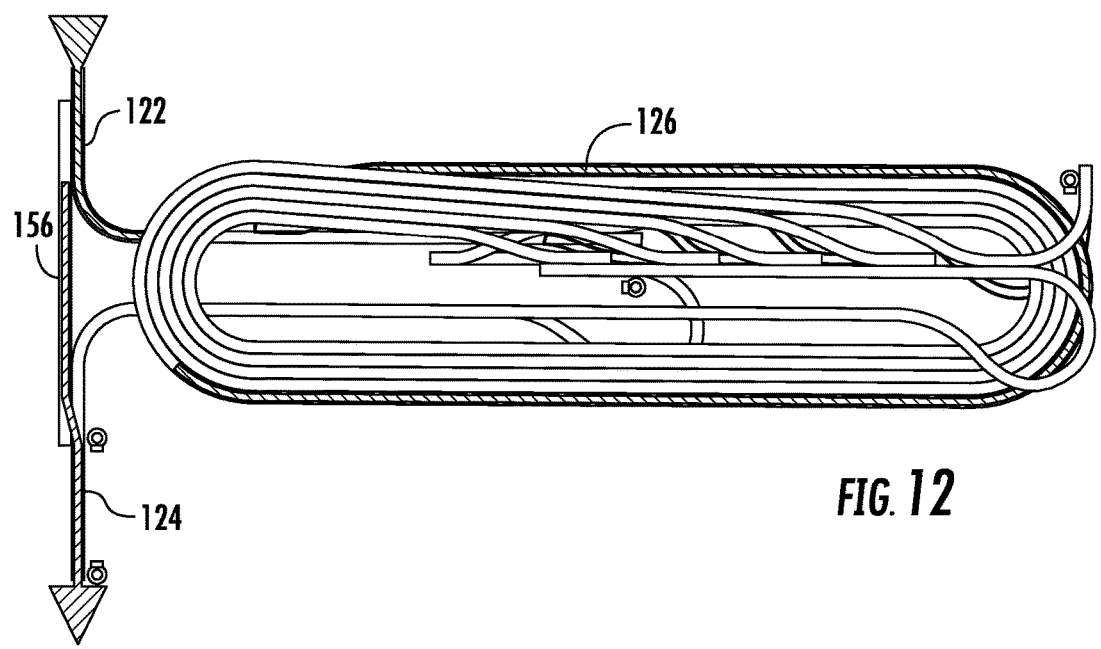

In FIG. 12, the downstream station has stopped and lane 1 is actively accumulating articles.

Figure 13:
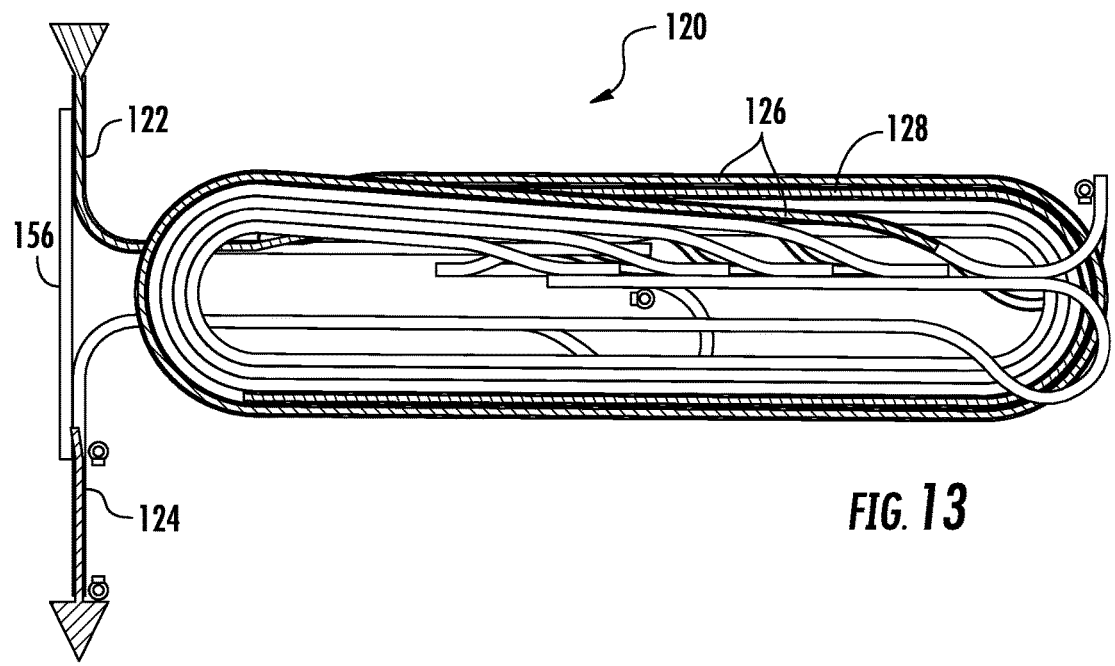

In FIG. 13, lane 1 is full and stopped, lane 2 is accumulating, and the downstream device has restarted.

Figure 14:
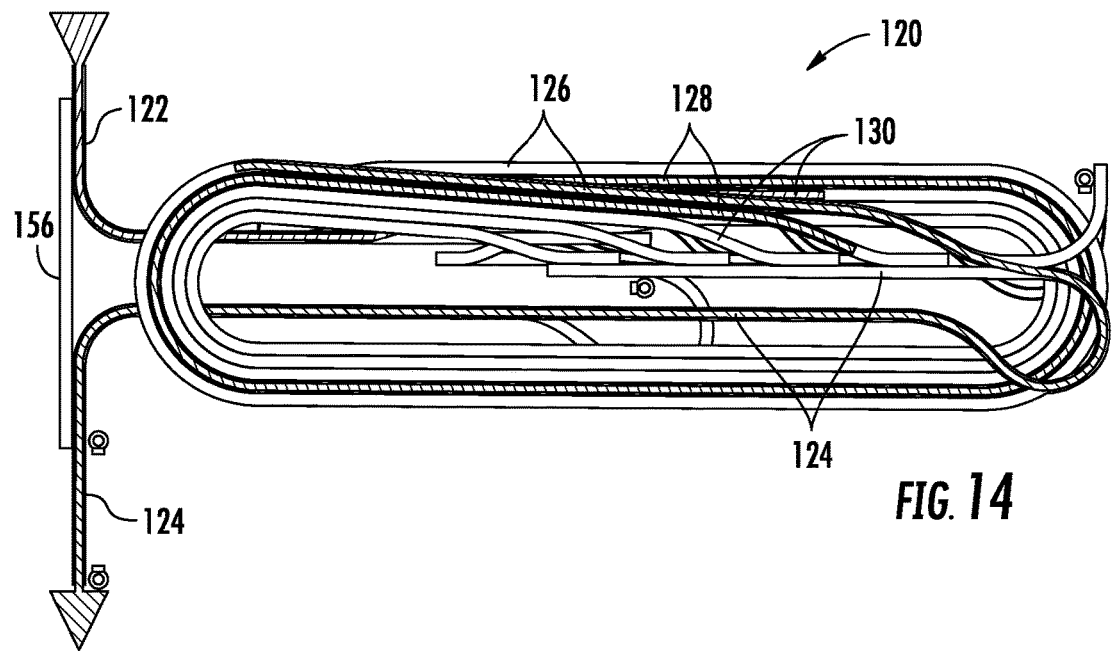

In FIG. 14, lane 1 is now emptying to outfeed conveyor 124, lane 2 is full and stopped, and lane 3 is accumulating.

Figure 15:
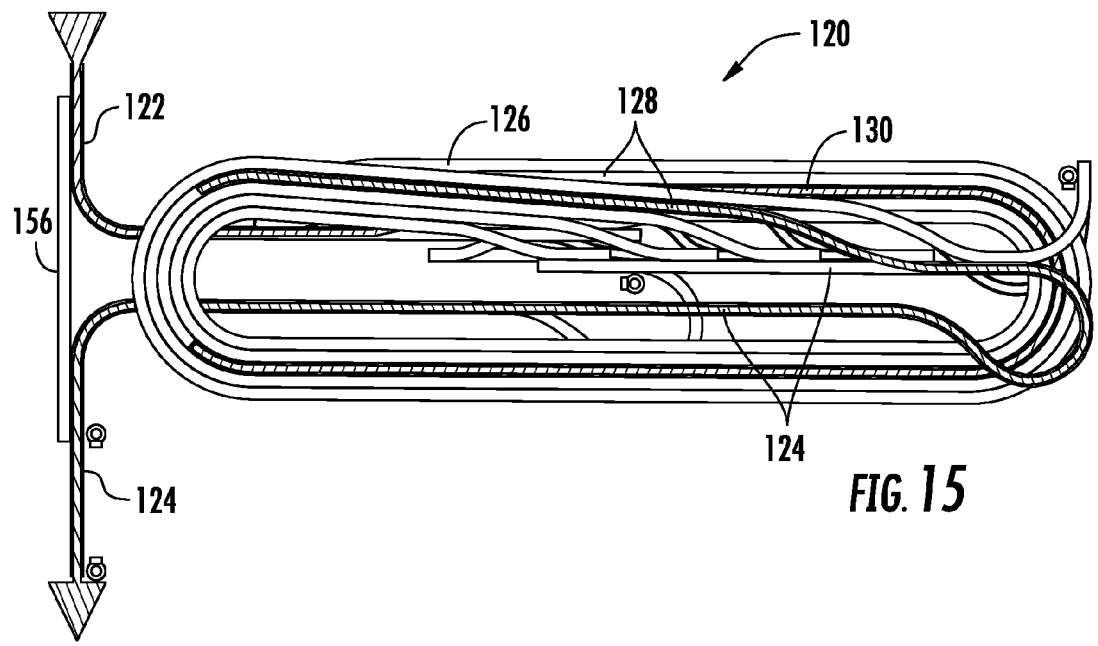

In FIG. 15, lane 1 is empty and stopped, lane 2 is emptying to outfeed conveyor 124, and lane 3 is still accumulating.

Figure 16:
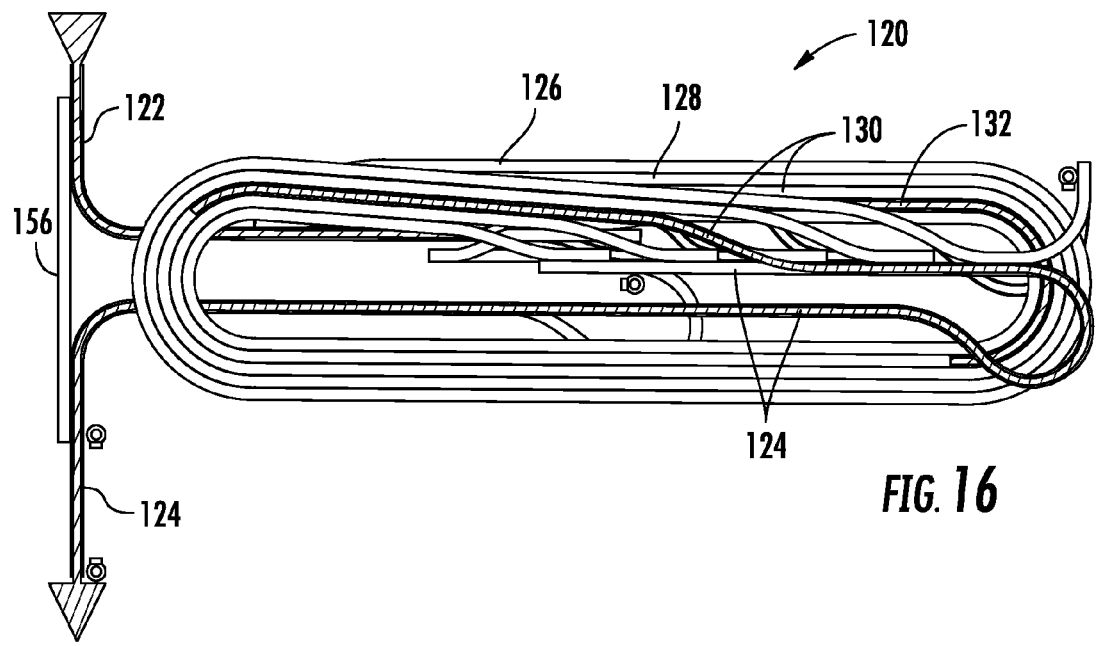

In FIG. 16, lane 2 is now empty and stopped, lane 3 is emptying to outfeed conveyor, and lane 4 is accumulating.

Figure 17:
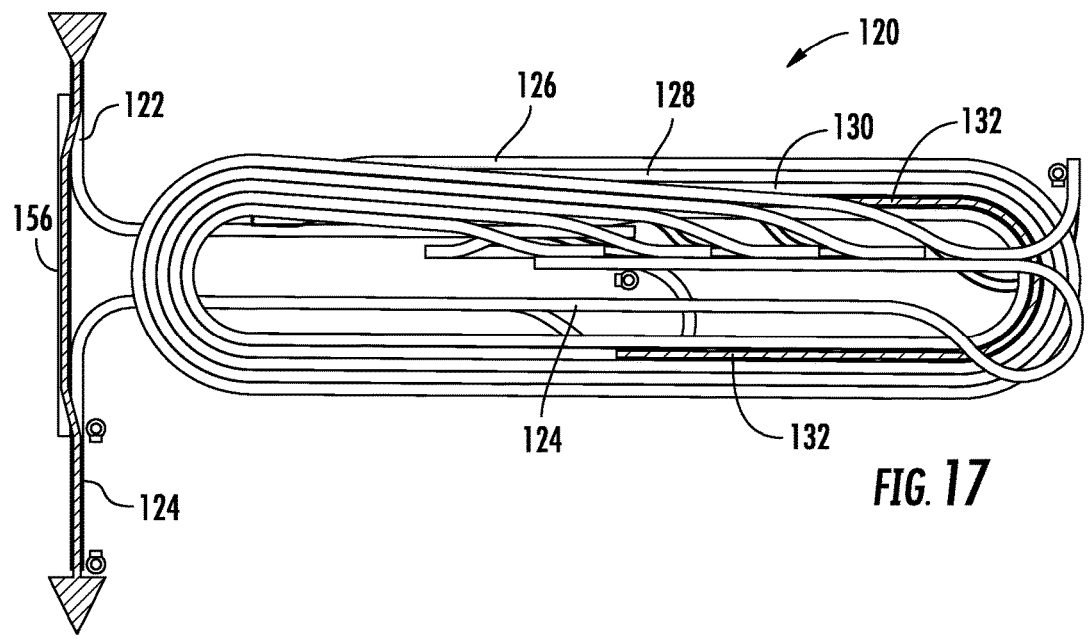

In FIG. 17, once lane 3 is finished discharging, the bypass conveyor 156 is reactivated. Some articles remain on lane 4, as above.

Figure 18:
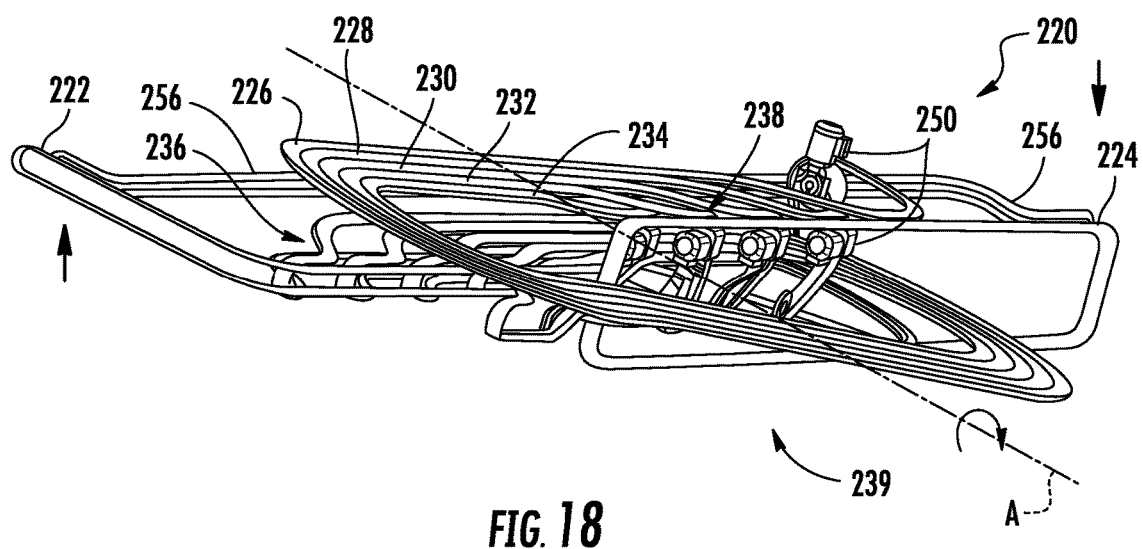
FIG. 18 is an isometric view of a modified version of the apparatus of FIG. 9.

FIG. 18 depicts an apparatus 220 that is a modified version of apparatus 120 of FIGS. 9-17. Like or similar reference numerals are used in FIG. 18 to denote like or similar elements. For brevity such parts will not be described again below, and differences will be highlighted.

Apparatus 220 differs from apparatus 120 in that outfeed conveyor 224 is a shorter loop that delivers conveyed articles out of apparatus 220 at an opposite side (right, as depicted) from infeed conveyor 222 (left, as depicted). Outfeed conveyor 224 thus does not include any first portion at a fully elevated level and second portion that is downwardly slanted for carrying articles back down to the level of the infeed conveyor 222, corresponding to conveyor section 125 in apparatus 120. Bypass 256 follows a different path in apparatus 220 as compared to apparatus 120. Otherwise, the various conveyors and motor drives of apparatus 220 are similar to those of apparatus 120.

Even though apparatus 220 has a vertical overlap along conveyors 226-234, it may be desirable to have outfeed conveyor 224 deliver articles at the same height from the floor as infeed conveyor 222. Accordingly, as illustrated, apparatus 220 can be tilted slightly by rotating around axis A from the orientation shown in apparatus 120 until outfeed conveyor 224 is at the height of infeed conveyor 222. This "tilt" can be achieved by simply making the legs on the outfeed side (as depicted) of apparatus 220 shorter than the legs on the infeed side (as depicted) of apparatus 220.

By way of example, in one embodiment the floor space occupied by the outline of apparatus (more or less the space taken up by conveyors 226-234) is roughly 10 feet by 30 feet, and the rise between the upper and lower portions of conveyors 226-234 is roughly 18 inches. The height difference in the legs of such apparatus would be easily calculable geometrically based on the difference in distance between the infeed conveyor 222 and the outfeed conveyor 224 on opposite sides of axis A and the spacing of legs holding up the apparatus. For example, if the infeed conveyor 222 and outfeed conveyor 224 portions to be leveled are 30 feet apart, and the outer legs are 30 feet apart, then the height difference needed between the legs to compensate for the rise in conveyors 226-234 would be 18 inches. If the infeed conveyor 222 and outfeed conveyor 224 portions to be leveled are 30 feet apart and the outer legs are only 25 feet apart, then the leg height difference would be only 15 inches (25/30×18). In such situations, the top surfaces of the previously horizontal portions of the conveyors would be slanted downward in the range of 2-3 degrees from horizontal in the direction from the infeed conveyor 222 to the outfeed conveyor 224. This amount of tilt is negligible and does not make the conveyed articles unsatisfactorily unstable.

As known to those skilled in the art, programmably controllable motors and a programmable logic controller (PLC) such as those sold by Allan Bradley or others can be used to control operation of the various conveyors and diverters based on the above disclosure.

Thus, apparatus 20, 120 and 220 provide a device and method of buffering a flow of articles within a system by sequentially filling and emptying accumulation conveyors. The system can flow continuously. No stopping and starting of flow is required to switch between lanes providing a more stable flow than some existing laned accumulators.

While preferred embodiments of the disclosure have been described above, it is to be understood that any and all equivalent realizations of the present disclosure are included within the scope and spirit thereof. Thus, the embodiments depicted are presented by way of example only and are not intended as limitations upon the present disclosure. While particular embodiments of the disclosure have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

We claim:

1. A device for buffering a flow of articles comprising:
   an infeed conveyor;
   an outfeed conveyor;
   at least two accumulation conveyors defining a path that is substantially horizontal and that includes at least one curve, the path extending between the infeed conveyor and the outfeed conveyor, each accumulation conveyor including an entrance portion adjacent the infeed conveyor for receiving articles from the infeed conveyor and an exit portion adjacent the outfeed conveyor for delivering articles to the outfeed conveyor; and
   each accumulation conveyor including an endless loop defining a total length, each path defining an active upper surface portion of the endless loop that is at least about 75% of the total length, the substantially horizontal portion of each path configured so that no portion of the active upper surface portion has vertical overlap with another portion of the active upper surface portion at any point between the infeed conveyor and the outfeed conveyor.

2. The device of claim 1, including at least four of the accumulation conveyors.

3. The device of claim 1, further including a bypass conveyor defining a path extending between the infeed conveyor and the outfeed conveyor for transferring articles between the infeed conveyor and the outfeed conveyor, the bypass conveyor path being substantially shorter than a path defined by each accumulation conveyor.

4. The device of claim 3, wherein the bypass conveyor is upstream of the accumulation conveyors.

5. The device of claim 1, wherein each accumulation conveyor includes a diverter adjacent the entrance portion for selectively diverting articles from the infeed conveyor to the accumulation conveyor.

6. The device of claim 5, wherein each diverter is movable between a first position permitting articles to move past the diverter on the infeed conveyor and a second position diverting articles from the infeed conveyor onto the accumulation conveyor.

7. The device of claim 1, where the infeed conveyor is uninterrupted as flow of articles from the infeed conveyor is directed first to one of the accumulation conveyors and then to another of the accumulation conveyors.

8. The device of claim 1, where the infeed conveyor is uninterrupted as flow of articles from the infeed conveyor is switched between the bypass conveyor and one of the accumulation conveyors.

9. The device of claim 1, where the outfeed conveyor is uninterrupted as flow of articles to the outfeed conveyor is received first from one of the accumulation conveyors and then from another of the accumulation conveyors.

10. The device of claim 1, where the outfeed conveyor is uninterrupted as flow of articles to the outfeed conveyor is switched between the bypass conveyor and one of the accumulation conveyors.

11. The device of claim 1, wherein the active upper surface portion of each accumulation conveyor is at least about 80% of the total length.

\* \* \* \* \*